(12) United States Patent
Engelhardt et al.

(10) Patent No.: US 6,418,153 B1
(45) Date of Patent: Jul. 9, 2002

(54) METHOD FOR OPERATING A LASER LIGHT SOURCE

(75) Inventors: Johann Engelhardt, Bad Schoenborn; Thomas Zapf, Speyer, both of (DE); William Hug, Pasadena, CA (US)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/307,738

(22) Filed: May 10, 1999

(51) Int. Cl.[7] .......................... H01S 3/101; G02B 26/10
(52) U.S. Cl. ......................................... 372/24; 359/368
(58) Field of Search ................... 372/38.04, 24; 359/368

(56) References Cited

U.S. PATENT DOCUMENTS

| | | | | |
|---|---|---|---|---|
| 4,972,258 A | * | 11/1990 | Wolf et al. .................... 348/79 |
| 5,280,164 A | * | 1/1994 | Barkan ......................... 235/467 |
| 5,691,839 A | * | 11/1997 | Kobayashi ................... 359/385 |
| 5,936,764 A | * | 8/1999 | Kobayashi ................... 359/385 |
| 6,102,293 A | * | 8/2000 | Barkan et al. ............. 235/462.3 |

* cited by examiner

Primary Examiner—Paul Ip
Assistant Examiner—Jeffrey Zahn
(74) Attorney, Agent, or Firm—Foley & Lardner

(57) ABSTRACT

In order to extend the life of the laser light source and to reduce the operating costs, a method for operating a laser light source, in particular for scanning in a confocal scanning laser microscope, the laser light source being supplied with electricity via a power pack, is one wherein the laser light source is operated with the requisite power essentially only during the working beam time, preferably during the data acquisition. When a pulsed laser light source is used, the working beam time, in particular the data acquisition, is essentially synchronized with the emission cycle of the laser light source.

27 Claims, 2 Drawing Sheets

METHOD FOR OPERATING A LASER LIGHT SOURCE

BACKGROUND OF THE INVENTION

The invention relates to a method for operating a laser light source, in particular for scanning in a confocal scanning laser microscope, the laser light source being supplied with electricity via a power pack. The invention also relates to a method for operating a pulsed laser light source.

In a confocal scanning laser microscope, or in the laser scanner therein, the laser light source is the most expensive component, with a price in the region of between DM 10,000 and DM 20,000, the life of the laser light source being a few thousand hours. The prior art has already disclosed a measure for extending the life of the laser. Specifically, it is already known to produce a so-called standby circuit, through the activation of which the laser is set to a minimum power status in which the gas discharge of the laser is just not quite struck. If the laser is not being used, and if the standby is therefore activated, procedures for switching on and off are not needed. The tube current is returned to the requisite operating level shortly before use, for example after a period during which no processing has been carried out.

When a confocal microscope is being used conventionally, the effective working beam time, i.e. the effective acquisition time, during which the laser light is actually used at full power, is extremely short. The majority of the overall operating time of a system of this type (usually more than 90%) is needed for preparing the experiment and for evaluating the data, while the laser light source generally remains switched on. This means that, for most of the time that it is switched on, the laser light source is not being used for anything, and therefore is being operated in a way that shortens its life.

It is also known that, in the case of gas lasers, for example argon or krypton lasers, their life decreases exponentially as the tube current increases.

SUMMARY OF THE INVENTION

The object of the present invention is therefore to extend the life of the laser light source through optimized operation, thereby reducing the overall operating costs.

The process according to the invention, of the generic type, achieves the above object through the features described herein. Accordingly, in a process for operating a laser light source, the laser light source is operated with the requisite power essentially only during the working beam time, preferably during the data acquisition. In the case when a pulsed laser light source is being used, the working beam time, in particular the data acquisition, is essentially synchronized with the emission cycle of the laser light source.

According to the invention, it has been established that, in particular in the case of confocal scanning laser microscopes, the laser light source is not being used for anything for most of the time that it is operated. This is due not only to genuine interruptions to work, in the course of which a conventional standby mode can be selected, but further to this laser light sources are only partially used during the data acquisition, even during the line cycle (e.g. in the x direction) or during the frame cycle (for example in the y direction). It may thus be assumed that, during the line cycle (in the x direction), only 25% of the time requirement of the overall cycle is needed for the x-scan in one direction. Because the inertia of the mirror is not negligible, it can be estimated that a further 25% of the total time is taken up by the respective changes in direction of the scanner. The same is true for the return travel of the scanner on the x axis, and for the further turn around for new run or scan.

If, in the scope of such a line cycle, detection were to be carried out only in one direction along the x axis, the laser light source would be used for only 25% of its total operating time. It can also be assumed that the frame cycle for the return travel to the starting position of the laser beam takes a further considerable amount of time, and this can also be estimated at about 25% of the total time. Consequently, the actual working beam time relative to the line cycle and the superimposed frame cycle would be 25% (or 50% for an operating procedure in both directions along the x axis) of 75% (the usable time in the y direction).

On the basis of the above considerations, it has been established according to the invention that the tube current of the laser ought to be reduced, and above all can be reduced, whenever this is possible taking into account the actual working beam time. In the optimum case, the laser is (fully) powered exclusively during the time for which the data acquisition takes place in the case of use in a confocal scanning laser microscope. In other words, the laser is switched at least to a substantially lower power during the return-travel times for the scanner in the x-y-z directions. In any case, the laser light source is operated with the requisite power essentially only during the working beam time, preferably during the data acquisition.

However, conventional types of lasers are complicated, and therefore expensive, insofar as if they are produced in large sizes they require a great deal of cooling. This is not the case with so-called "deep UV lasers", such lasers being available with sufficient power using the wavelengths 224, 248, 260, 270 or 280 nm in the form of vapor/gas lasers (HeAg, NeCu, HeAu). These lasers are, however, pulsed, which is a disadvantage for confocal scanning laser microscopy, and this being the case they usually have a duty cycle of from 50% down to only a few percent, for example 5%. The pulse repetition rate is also very low, so that to date these lasers have not been suitable as light sources for a scanning laser microscope.

As an alternative to the process described above, it is now also possible (in the scope of independent patent claim 2), to use such deep UV lasers in confocal scanning laser microscopy, in that to be precise the working beam time, in particular the data acquisition, is essentially synchronized with the emission cycle of the laser light source. In other words, the duty cycle of the scanner is matched to the duty cycle of the laser light source.

The following numerical example demonstrates the relevance of such an application:

With the PRF (pulse repetition frequency) of 500 Hz (=2 ms) and a duty cycle of 5% (=0.1 ms), a match to a scanner for the x direction with a line frequency of 8 kHz (=125 µs period) could be made as follows: one of the two "linear" ranges usable for scanning is equal to one quarter of the period, i.e. approximately 30 µs. Within the 0.1 ms (100 µs) duty cycle of the laser, it is therefore possible to scan about 2 lines. However, a prerequisite for this is that, shortly after the start of the light pulse, the scanner is at the start of a "linear" scan region and can scan the first line. If the scanner also scans in the y direction during this duty cycle, a further line is also scanned during the return travel in the x direction, since the laser light is still "turned on". An x scanner with a low frequency (for example 4 kHz) can then, with suitable synchronization, only record one line per duty cycle. This may, however, in the case of weak fluorescence signals, be advantageous for the measured signal-to-noise ratio.

The scanning therefore takes place only during the duty cycle of the laser, and the acquisition process is idle for the rest of the time.

Notwithstanding the alternative embodiments of the process according to the invention which have been explained above, the laser power can in principle be reduced outside the working beam time, i.e. whenever the full laser power is not needed. Such a reduction in the laser power outside the working beam time, i.e. application of reduced power to the laser light source, can be achieved by conventional dimming of the laser light source, so long as the type of laser is suitable for this. As a concrete example, the power of the laser light source could be reduced to about 20%, and in the scope of a particularly advantageous embodiment, the laser power is reduced outside the working beam time such that the laser light source is just still on.

It is also conceivable for the laser to be supplied with electricity only during the working beam time, or put another way it is at least briefly turned off outside the working beam time. In order to turn the laser light source on again, a special starting aid could be employed, with the specific intent of reobtaining a usable laser beam as quickly as possible.

In order to achieve the measure according to the invention, it is possible that the laser power pack is controlled using a synchronization signal made available by the scanner. Through this synchronization signal, the laser emission is (by fast synchronization) optimally matched to the duty cycle of the scanner, so that the laser light source is only fully powered, or only operates at the full power level, if data acquisition is is being carried out in the scope of the "genuine" working beam time.

It is also conceivable to configure the process described above in order to switch, or modulate, a laser light source in such a way that lasers of the same power are driven in modulated operation with higher power, but without thermally overloading them. Ultimately, this gives rise to power spikes which just still permit this kind of modulated operation. In this case, it is even possible, with a small air-cooled laser, to increase the power over an albeit relatively short data acquisition time for a line up to a level where even UV lines start to lase. The demand on the laser cooling system is in this case substantially less in comparison with continuous operation at the maximum power level.

If the laser light source is being used for scanning in a confocal scanning laser microscope, the full-power working beam time could be defined by the data acquisition during preferably meandering line cycles. The sample would then be scanned in a meandering way. In this case, especially when a pulsed laser light source is being used, it is possible to make the data acquisition take place in every n-th line, preferably in every second line, with the specific intent of being able to exploit the duty cycle of the laser light source fully. Scanning would then be carried out exclusively during the duty cycle of the laser, irrespective of how many lines are covered outside the duty cycle of the laser light source.

Lastly, it is also conceivable to carry out the return travel of the scanner through preferably meandering line cycles, with the specific intent of effectively minimizing the actual return-travel time in the scope of the frame cycle. The same procedures as in the aforementioned line cycle in the x direction then apply.

There are now a variety of possible ways of refining and developing teaching of the present invention in an advantageous fashion. In this regard, reference may be made on the one hand to the claims subordinate to independent patent claims 1 and 2, and on the other hand to the following explanation of the process according to the invention in conjunction with the drawing. In connection with the explanation of the process according to the invention, advantageous embodiments will also be explained. In the drawing.

DESCRIPTION OF THE PREFERRED EMBODIMENTS

Figure 1:
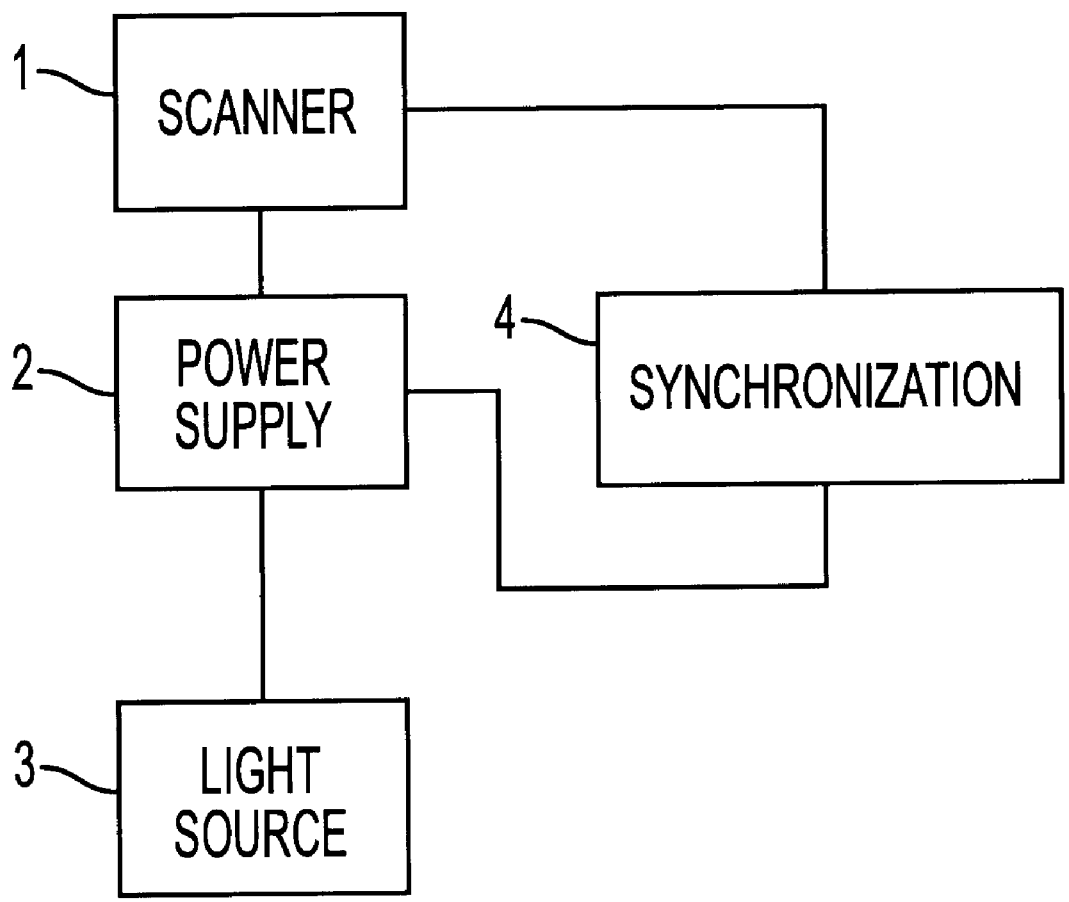
FIG. 1 symbolically shows the process according to the invention in a schematic representation.

Using a block diagram, FIG. 1 shows the basic mode of operation of the process according to the invention for operating a laser light source, the scanner 1 and the power supply 2 of the laser light source 3 being synchronized. The synchronization is identified by the reference number 4.

The effect achieved by the synchronization 4 is that the laser light source 3 is operated with the required power, or supplied with the required current, essentially only during the working beam time, i.e. preferably during the data acquisition in the case of use in a confocal scanning laser microscope.

Figure 2:
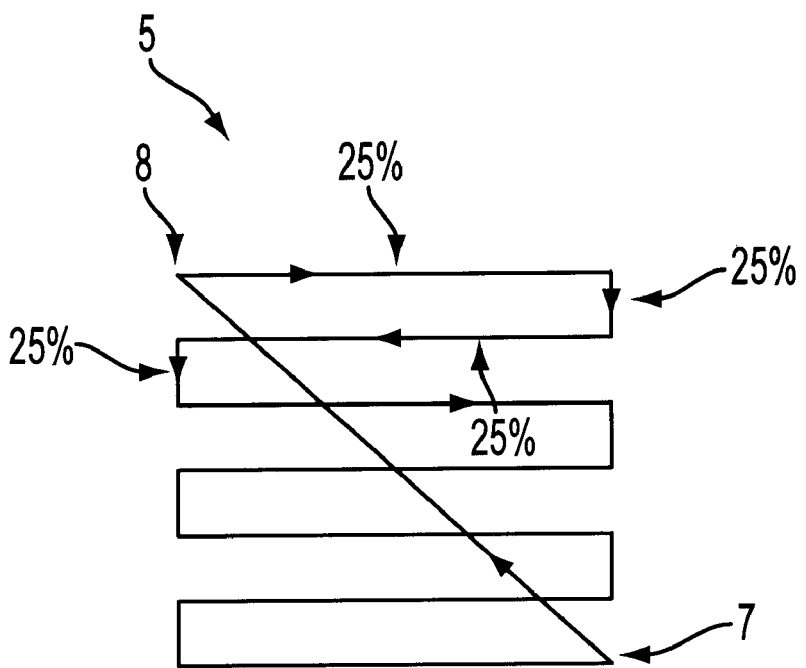
FIG. 2 shows a line cycle in the x direction in a schematic representation.

FIG. 2 shows a line cycle 5 in the x direction, the scanning in the x direction (per line) requiring 25% of the total time of the line cycle in the illustrative embodiment chosen here. Because of the inertia of the mirror which is used, the change in direction also takes up 25% total time of the line cycle. The same is true for the line scanning in the opposite direction, and the subsequent further turn around into the actual scanning direction (x direction).

FIG. 2 makes it especially clear that, in the case of data acquisition in only one direction (x direction)—without using the change in direction—only 25% of the line cycle is used for the data acquisition as a working beam time, or used for the data acquisition. If the laser light source is operated with the required power exclusively in the actual working beam time, i.e. for the data acquisition, considerable energy savings could be made, and the life of the laser light source could be increased significantly, if the power is reduced outside the working beam time.

Figure 3:
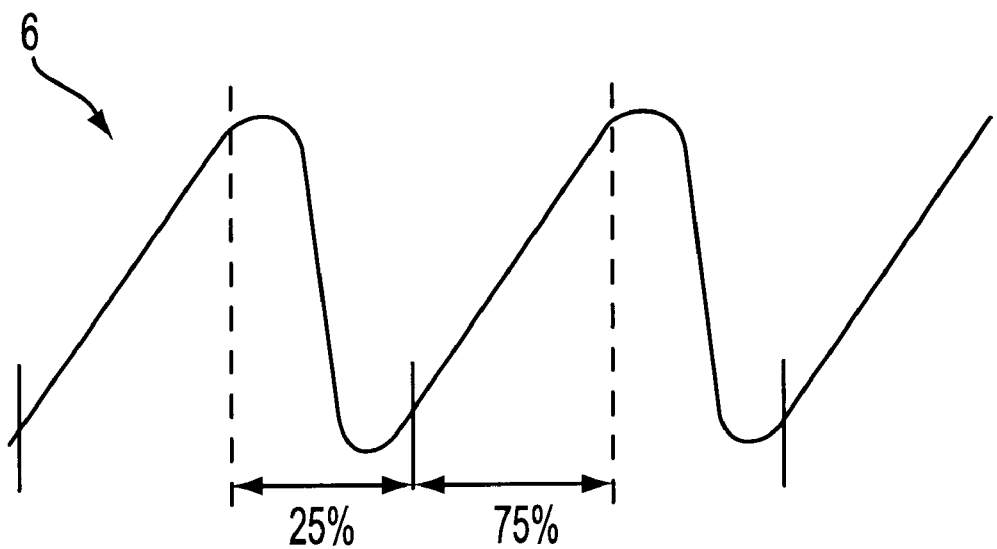
FIG. 3 shows a frame cycle in the y direction in a schematic representation.

FIG. 3 shows the frame cycle 6 in the y direction. After the line-wise meandering scanning according to the representation in FIG. 2, it is necessary to return the scanner from the position 7 at the lower right there back to the starting position 8. To this end, the scanner could be reset diagonally. This takes about 25% of the total period of the frame cycle, so that in view of this 75% of the frame cycle could be used for the actual data acquisition. In this case, the linear range of the curve profile represented in FIG. 3 should be used.

In order to avoid repetition, reference may be made to the general part of the description as regards the further features.

What is claimed is:

1. A method for operating a laser light source in a confocal scanning laser microscope having a scanner with a scanning mirror moveable in at least an X and Y direction, comprising the steps of:

supplying the laser light source with electricity via a power supply;

controlling the power supply with a synchronization signal that corresponds to a position of the scanning mirror of the scanner;

operating the laser light source with a requisite power during a working beam time, wherein the working beam time is defined by data acquisition during a portion of a line cycle when the scanning mirror is scanning in an X direction; and operating the laser light source at a power lower than the requisite power when the scanning mirror is moving in the Y-direction, said Y-direction different from the X-direction.

2. The method according to claim 1, wherein the scanner further scans in a Z-direction perpendicular to an X-Y plane.

3. The method as claimed in claim 1, further comprising:

not operating the laser light source during a return of the scanning mirror to a first scan position.

4. The method as claimed in claim 1, wherein the laser light source is dimmed outside the working beam time.

5. The method as claimed in claim 1, wherein the power of the laser light source is reduced to about 20% outside the working beam time.

6. The method as claimed in claim 1, wherein the laser power is reduced outside the working beam time such that the laser light source is just still on.

7. The method as claimed in claim 1, wherein the laser light source is at least briefly turned off outside the working beam time.

8. The method as claimed in claim 7, wherein the laser light source is turned on again with the assistance of a starting aid.

9. The method according to claim 1, wherein the laser light source is a gas laser.

10. The method as claimed in claim 1 wherein the scanner is controlled using a synchronization signal made available by the laser light source, wherein the laser light source is a pulsed laser light source.

11. The method according to claim 1, wherein the laser light source is a UV/deep UV laser.

12. The method as claimed in claim 1 wherein the data acquisition takes place in every second line.

13. A method for operating a UV/deep UV laser light source in a confocal scanning laser microscope having a scanner capable of multi-dimensional scanning with a scanning mirror moveable in at least an X and Y direction, comprising the steps of:

supplying the UV/deep UV laser light source with electricity via a power supply;

controlling the power supply with a synchronization signal that is synchronized to an emission cycle of the UV/deep UV laser light source, wherein a duty cycle of the scanner is matched to a duty cycle of the UV/deep UV laser light source; and operating the laser light source with a requisite power during a working beam time, wherein the working beam time is defined by data acquisition during a portion of a line cycle when the scanning mirror is scanning in at least an X direction.

14. The method of claim 13, further comprising:

operating the laser light source with a requisite power during a portion of a line cycle when the scanning mirror is scanning in a Y direction.

15. A method for operating a pulsed laser light source for scanning in a confocal scanning laser microscope having a scanner with a scanning mirror moveable in at least an X and Y direction, comprising the steps of:

supplying the pulsed laser light source with electricity via a power supply;

synchronizing a working beam time of the pulsed laser light source with the emission cycle of the pulsed laser light source; and operating the pulsed laser light source with requisite power during a working beam time, wherein the working beam time is defined by data acquisition during a portion of a line cycle when the scanning mirror is scanning in an X direction; and operating the pulsed laser light source at a power lower than the requisite power when the scanning mirror is moving in the Y-direction, said Y-direction different from the X-direction.

16. The method as claimed in claim 15, further comprising:

not operating the pulsed laser light source during a return of the scanning mirror to a first scan position.

17. The method as claimed in claim 15, wherein the pulsed laser light source is dimmed outside the working beam time.

18. The method as claimed in claim 15, wherein the power of the pulsed laser light source is reduced to about 20% outside the working beam time.

19. The method as claimed in claim 15, wherein the laser power of the pulsed laser light source is reduced outside the working beam time such that the pulsed laser light source is just still on.

20. The method as claimed in claim 15, wherein the pulsed laser light source is at least briefly turned off outside the working beam time.

21. The method as claimed in claim 20, wherein the pulsed laser light source is turned on again with the assistance of a starting aid.

22. The method as claimed in claim 15, wherein the laser power supply is controlled using a synchronization signal made available by the scanner.

23. The method as claimed in claim 22, wherein the pulsed laser light source is a vapor/gas laser.

24. The method as claimed in claim 15, wherein the data acquisition takes place in every second line.

25. The method according to claim 15, wherein the scanner further scans in a Z-direction perpendicular to an X-Y plane.

26. The method according to claim 15, wherein the pulsed laser light source is a UV/deep UV laser.

27. A confocal scanning laser microscope, comprising:

a scanner with a scanning mirror moveable in at least an X and Y direction;

a laser light source;

a power supply supplying the laser light source with power; and a controller for controlling the power supply with a synchronization signal that corresponds to a position of the scanning mirror of the scanner, wherein the laser light source is operated with a requisite power during a working beam time, wherein the working beam time is defined by data acquisition during a portion of a line cycle when the scanning mirror is scanning in an X direction, and wherein the laser light source is operated at a power lower than the requisite power when the scanning mirror is moving in the Y-direction, said Y-direction different from the X-direction.

* * * * *

UNITED STATES PATENT AND TRADEMARK OFFICE
CERTIFICATE OF CORRECTION

PATENT NO.    : 6,418,153 B1
DATED         : July 9, 2002
INVENTOR(S)   : Johann Engelhardt et al.

It is certified that error appears in the above-identified patent and that said Letters Patent is hereby corrected as shown below:

<u>Title page,</u>
Insert -- Item [30],    Foreign Application Priority Data
May 8, 1998    (DE)        198 20 575.9 --

Signed and Sealed this

Fifteenth Day of October, 2002

Attest:

Attesting Officer

JAMES E. ROGAN
*Director of the United States Patent and Trademark Office*